US012682900B1

(12) United States Patent
Ontivillu et al.

(10) Patent No.: US 12,682,900 B1
(45) **Date of Patent: *Jul. 14, 2026**

(54) MASS-BASED CLUSTERING OF UTTERANCES IN FINANCIAL CONTEXTS

(71) Applicant: U.S. Bank National Association, Minneapolis, MN (US)

(72) Inventors: Nishanthini Ontivillu, Eagan, MN (US); Seema Sunil Savadi, Irving, TX (US); Steven Benjamin Taylor, Bloomington, MN (US)

(73) Assignee: U.S. Bank National Association

( * ) Notice: Subject to any disclaimer, the term of this patent is extended or adjusted under 35 U.S.C. 154(b) by 0 days.

This patent is subject to a terminal disclaimer.

(21) Appl. No.: 19/456,387

(22) Filed: Jan. 22, 2026

Related U.S. Application Data

(63) Continuation of application No. 19/314,619, filed on Aug. 29, 2025, now Pat. No. 12,562,168.

(51) Int. Cl.
| | |
|---|---|
| *G10L 21/00* | (2013.01) |
| *G10L 15/183* | (2013.01) |
| *G10L 15/22* | (2006.01) |
| *G10L 25/00* | (2013.01) |
| *G10L 25/48* | (2013.01) |

(52) U.S. Cl.
CPC ............ *G10L 15/22* (2013.01); *G10L 15/183* (2013.01); *G10L 25/48* (2013.01); *G10L 2015/223* (2013.01); *G10L 2015/227* (2013.01)

(58) Field of Classification Search
CPC .......... G06F 16/90335; G06Q 30/0279; G06Q 30/0201; G06N 20/00; G06N 5/02; G06N 5/04; G06N 3/04; G10L 15/22; G10L 15/183; G10L 25/48; G10L 2015/223; G10L 2015/227
See application file for complete search history.

(56) References Cited

U.S. PATENT DOCUMENTS

2025/0054493 A1* 2/2025 Weston ................. G10L 15/063

OTHER PUBLICATIONS

Yang et al., Clustering via torque balance with mass and distance, Apr. 2020, https://arxiv.org/pdf/2004.13160.

* cited by examiner

*Primary Examiner* — Michael Ortiz-Sanchez
(74) *Attorney, Agent, or Firm* — Garg Law Firm, PLLC; Rakesh Garg; Chris Ziolkowski

(57) ABSTRACT

A set of embeddings is generated from the data of a set of utterances originating in a financial data processing environment. An embedding corresponds to an utterance and includes a multidimensional vector whose dimensionality is reduced forming a compressed vector. A mass value is assigned to the compressed vector (mass-bearing data point (MD)). A set of MDs corresponds to the set of utterances. For a neighborhood of the MD, a torque value is iteratively adjusted using mass values and pairwise distances between pairs of members of the neighborhood of MD. After reaching an exit condition, a cluster is output with a better coherency correspondence with a singular actionable label as compared to another coherency correspondence of another cluster formed without the mass assignment or torque based adjustment. An operation is triggered from the actionable label in the financial data processing environment.

20 Claims, 10 Drawing Sheets

```
┌─────────────────┐     ┌─────────────────┐     ┌─────────────────┐
│   UTTERANCE /   │     │      TEXT       │     │   EMBEDDINGS    │
│    DATA PULL    │ ──▶ │ PRE-PROCESSING  │ ──▶ │   (SENTENCE     │
│       202       │     │       204       │     │  TRANSFORMERS)  │
│                 │     │                 │     │       206       │
└─────────────────┘     └─────────────────┘     └─────────────────┘
                                                         │
                                                         ▼
                                                ┌─────────────────┐
                                                │   CLUSTERING    │
                                                │  USING K-MEANS /│
                                                │  AGGLOMERATIVE  │
                                                │     MODELS      │
                                                │       208       │
                                                └─────────────────┘
                                                         │
                                                         ▼
                                                ┌─────────────────┐
                                                │   EVALUATION    │
                                                │ USING SILHOUETTE│
                                                │ COEFFICIENT AND │
                                                │    THRESHOLD    │
                                                │       210       │
                                                └─────────────────┘
                                                         │
                                                         ▼
┌─────────────────┐     ┌─────────────────┐     ┌─────────────────┐
│  CLUSTER/LABEL  │     │     CLUSTER     │     │                 │
│ REVIEWS/ HUMAN  │ ◀── │ VISUALIZATION   │ ◀── │     CLUSTER     │
│   EVALUATION    │     │ USING T-SNE PLOTS│    │    LABELING     │
│       216       │     │       214       │     │       212       │
└─────────────────┘     └─────────────────┘     └─────────────────┘
```

*Fig. 3*                                                                          300
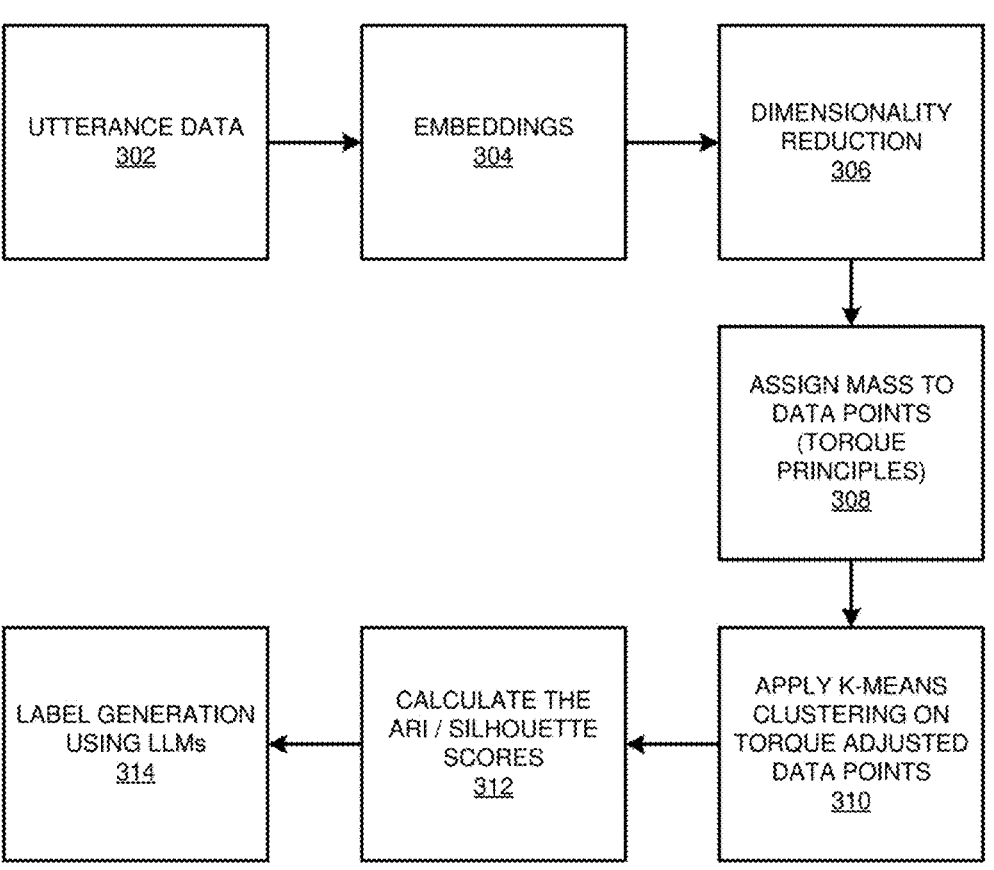

400

UTTERANCE
DATA
404

FINANCIAL UTTERANCE
CLUSTERING APPLICATION
402

PREPROCESSING
406

EMBEDDING GENERATION
408

DIMENSIONALITY REDUCTION
410

MASS ASSIGNMENT
412

TORQUE ADJUSTED CLUSTERING
414

CLUSTER SCORING
416

LABEL GENERATION
418

ACTIONABLE
LABELS
420

FEATURE
DEVELOPMENT SYSTEM
422

USER MANAGEMENT
AND SUPPORT SYSTEM
424

WORKFLOW MANAGEMENT
AND CHANGE SYSTEM
426

HUMAN SUPERVISION
428

*Fig. 5*
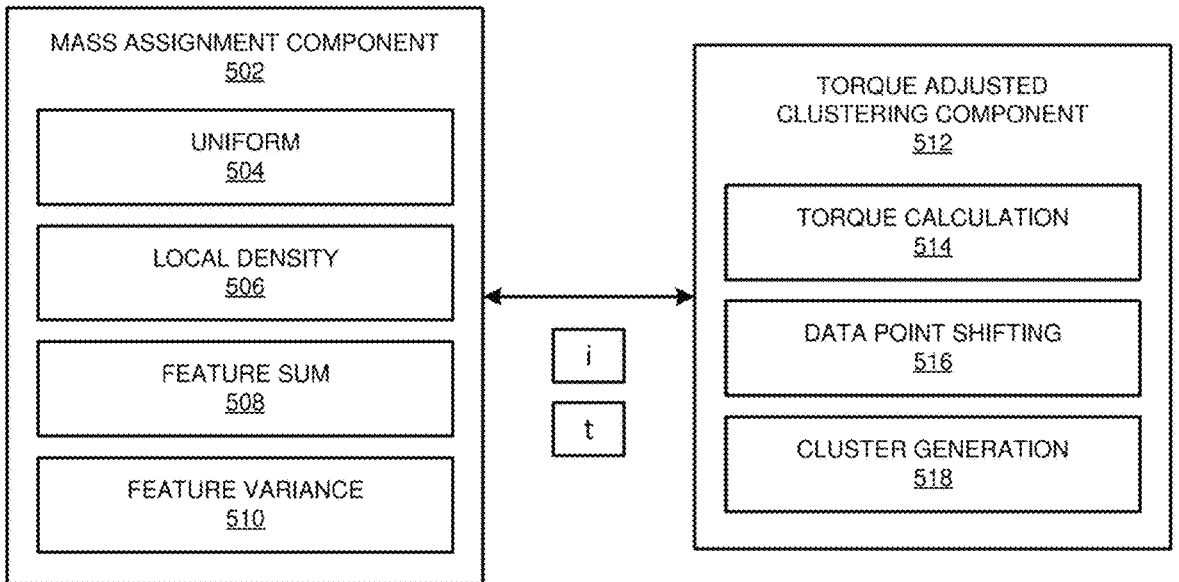

K-MEANS ON 768 FEATURES

| ALGORITHM | ARI (ADJUSTED RAND INDEX) | SILHOUETTE | NUMBER OF CLUSTERS |
|---|---|---|---|
| K-MEANS | 0.67614 | 0.13491 | 12 |
| K-MEANS ON TORQUE ADJUSTED (UNIFORM) | 0.11720 | -0.00948 | 13 |
| K-MEANS ON TORQUE ADJUSTED (DENSITY) | 0.15277 | 0.08709 | 2 |
| K-MEANS ON TORQUE ADJUSTED (FEATURE SUM) | 0.15618 | 0.08745 | 2 |
| K-MEANS ON TORQUE ADJUSTED (FEATURE VARIANCE) | 0.15618 | 0.08745 | 2 |

700

K-MEANS ON UMAP REDUCED FEATURES

| ALGORITHM | ARI (ADJUSTED RAND INDEX) | SILHOUETTE | NUMBER OF CLUSTERS |
|---|---|---|---|
| K-MEANS | 0.67616 | 0.13261 | 13 |
| K-MEANS ON TORQUE ADJUSTED (UNIFORM) | 0.19813 | -0.16725 | 14 |
| K-MEANS ON TORQUE ADJUSTED (DENSITY) | 0.66650 | 0.68007 | 14 |
| K-MEANS ON TORQUE ADJUSTED (FEATURE SUM) | 0.66650 | 0.68007 | 14 |
| K-MEANS ON TORQUE ADJUSTED (FEATURE VARIANCE) | 0.67927 | 0.64904 | 13 |

K-MEANS ON 768 FEATURES WITH TORQUE ADJUSTED USING K=5 NEIGHBORS

| ALGORITHM | ARI (ADJUSTED RAND INDEX) | SILHOUETTE | NUMBER OF CLUSTERS |
|---|---|---|---|
| K-MEANS | 0.66451 | 0.13261 | 14 |
| K-MEANS ON TORQUE ADJUSTED (UNIFORM) | 0.60447 | 0.11131 | 13 |
| K-MEANS ON TORQUE ADJUSTED (DENSITY) | 0.71468 | 0.13507 | 13 |
| K-MEANS ON TORQUE ADJUSTED (FEATURE SUM) | 0.71468 | 0.13507 | 13 |
| K-MEANS ON TORQUE ADJUSTED (FEATURE VARIANCE) | 0.68980 | 0.13561 | 14 |

*Fig. 9*
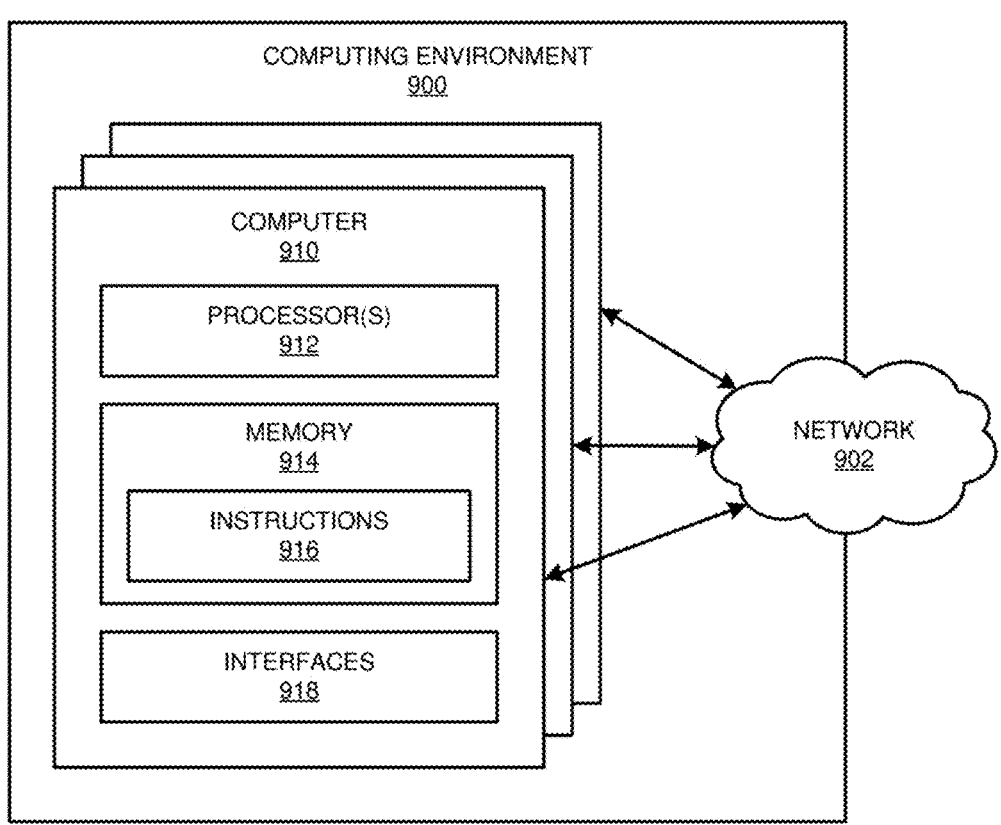

1001

MASS-BASED CLUSTERING OF UTTERANCES IN FINANCIAL CONTEXTS

The present application is a CONTINUATION of U.S. patent application Ser. No. 19/314,619, titled MASS-BASED CLUSTERING OF UTTERANCES IN FINANCIAL CONTEXTS, and filed on Aug. 29, 2025.

BACKGROUND

When an artificial intelligence (AI) system receives a piece of information-be it a written note, a spoken remark, or a screen tap-it first converts the raw artefact into a list of tokens that the system can process. For text, this means breaking the utterance into words and mapping each word to a unique numeric code from a domain-specific dictionary (for example, a customer-service chatbot may only know grocery-related terms). Spoken input is first transcribed into text, then handled in the same manner. Numerical entries, such as order quantities or temperature readings, are already in a numeric format but may still be scaled so that all fields occupy a comparable range. Because the tokenizer is built from data specific to the system's topic, each resulting code carries knowledge about the context in which it was used.

With a chain of numeric codes, the next step uses a trained encoder-typically a transformer-style neural network-to collapse the sequence into a single vector of fixed length. In a way, the encoder functions as a summarizer by reading the token list and based on learned patterns from similar training data, emitting an array of numbers that summarizes the overall intent and nuance of the input. Because an encoder has previously been exposed to items from the given domain, some encoders can detect subtle distinctions-such as whether a request is a casual question, a formal inquiry, or an escalation-without explicit labels.

After many such inputs have been turned into vectors, an unsupervised clustering algorithm organizes the vectors by similarity. The algorithm repeatedly groups together vectors that fall close to one another in this high-dimensional space while excluding those that diverge significantly. As a result, clusters emerge that contain all inputs sharing a common theme-say, "requesting product availability" or "reporting a defect." Via training and machine learning, the grouping is derived purely from the geometry of the vectors without requiring pre-defined categories. This manner of clustering is generally suitable for a variety of applications and makes the process flexible enough to adapt as new types of input appear.

Because every token comes from a curated dictionary tied to a specific area (for example, a logistics support system that only knows terms like "shipment," "delivery window," or "carrier"), the embedding space is restricted to that field. Consequently, phrases that convey the same idea but use different wording are pulled into the same region, while unrelated utterances remain differently clustered without any common clusters. This confinement ensures that the clusters correspond to meaningful distinctions within the application's context, rather than arbitrary statistical noise.

SUMMARY

The present disclosure includes inventive concepts relating generally to generating code for a graphical user interface, such as methods, systems, and computer programs for mass-based clustering of utterances in financial contexts. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes generating, by executing an embedding generation model on data of a set of utterances originating in a financial data processing environment, a set of embeddings, an embedding in the set of embeddings comprising a multidimensional vector corresponding to an utterance in the set of utterances. The embodiment further includes generating, by reducing a dimensionality of the embedding, a reduced dimension embedding (compressed vector). The embodiment further includes forming, by assigning a mass value to the compressed vector to form a mass-bearing data point (MD), a set of MDs corresponding to the set of utterances. The embodiment further includes iteratively adjusting, for a first subset of MDs from the set of MDs, the first subset of MDs including the MD and forming a neighborhood of the MD, a torque value using mass values and pairwise distances between pairs of members of the subset of MDs, a distance between the MD and a first member MD (MD1) in the first subset of MDs. The embodiment further includes outputting, after reaching an exit condition in the iteratively adjusting, a cluster comprising a second subset of MDs, the second subset of MDs having a better coherency correspondence by corresponding with a singular actionable label as compared to a second coherency correspondence of a cluster formed from a subset of compressed vectors mass-based adjustments, the second coherency correspondence being with a plurality of actionable labels. The embodiment further includes triggering from the actionable label, an operation in the financial data processing environment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

FIG. 2 depicts an existing clustering process that can be improved in accordance with an illustrative embodiment.

FIG. 3 depicts an improved clustering process using torque principles in accordance with an illustrative embodiment.

FIG. 5 depicts various modes of mass assignment and torque adjusted clustering in accordance with an illustrative embodiment.

FIG. 9 depicts a data processing environment in which aspects of the present disclosure may be implemented.

DETAILED DESCRIPTION

Figure 1:
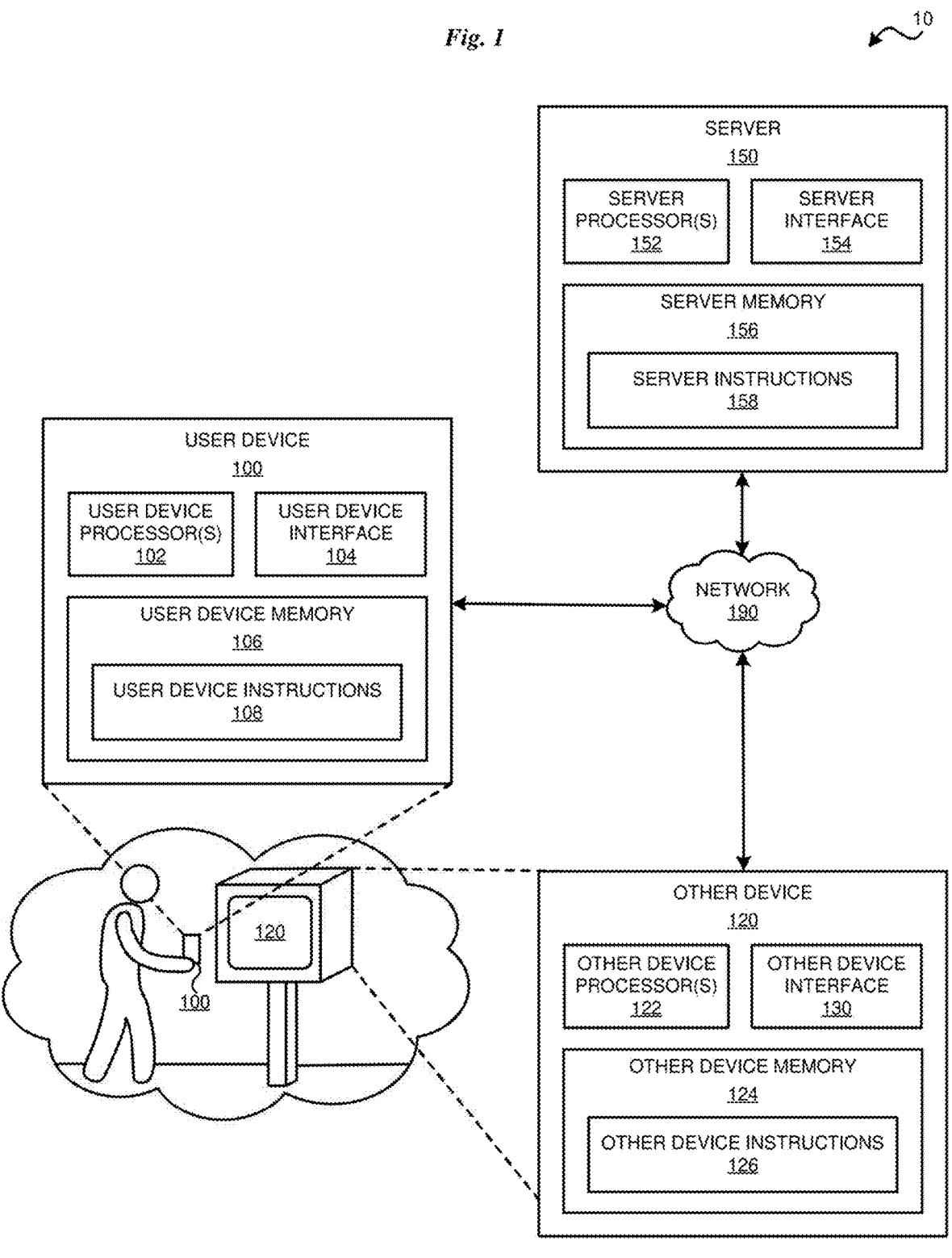
FIG. 1 depicts a block diagram of a computing environment in which an illustrative embodiment may be implemented.

The illustrative embodiments recognize that users of modern financial applications or personal devices often communicate with a blend of spoken or written utterances that may be terse, highly elaborate, or somewhere in between. A single phrase can contain shorthand references to account balances, trade execution, or regulatory policy-terms that are deeply embedded in financial jargon. Because the same words can appear in very different contexts (e.g., "margin call" as a warning versus a feature request), the raw text or speech alone does not dictate meaning. This richness of expression, including contractions, verbal and nonverbal gestures, creates a wide spectrum of possible user intents that a financial industry specific AI system must capture. Utterances made in a financial context or relative to a financial application and having these characteristics are referred to hereinafter as "financial utterance" or grammatical variations thereof. Furthermore, a reference to an utterance relative to an embodiment hereinafter is a reference to a financial utterance unless expressly distinguished where used.

The placement or position of specific word or words in an utterance, the intonation with which a word or phrase is delivered, the speed or pattern or another characteristic of a gesture, and the surrounding situational cues can all shift the intended meaning of an utterance. For instance, a user might say "help with transfer" while walking into a branch office, which could be a request for online support, or they might say the same words while standing in a waiting room, which could be a complaint about service delays, or they might say the same words at a machine, such as an Automatic Teller Machine (ATM), which could be a request for executing a feature already implemented in the machine, or a request that a feature be implemented for the machine, or request for customer support, or a statement realizing a mistake which inherently means asking to cancel a transfer and doing something else. These subtle variations mean that the same lexical content may map to multiple, sometimes competing, semantic outcomes. Consequently, a mapping of wording to category as is normally done in presently available clustering techniques-particularly for the financial applications-becomes untenable, limiting, and insufficient.

Because of this complexity in the utterances in the financial industry use cases, the illustrative embodiments recognize that categorizing financial utterances is far more complex than classifying numerical data or text confined to a single domain. Numerical inputs simply map to quantitative values regardless of context, while text limited to a defined domain (e.g., product reviews) has clear expectations about content and intent. In contrast, financial user utterances are fluid, with intent potentially varying across time, location, situation, context, emotional state of the speaker, history, and many other factors that are particularly important and complicated in this industry. This fluidity requires AI models to be able to cluster financial utterances with contextual awareness and sensitivity to prosody and discourse structure.

To handle such variability, financial industry AI systems may leverage multimodal signals-capturing both the linguistic content and paralinguistic features like tone, pacing, placement, and pauses-alongside contextual metadata such as location, time, device or application state, transaction history, recent user actions, actions and/or utterances of other users, or some combination of these and other similar metadata and cues. The illustrative embodiments recognize that presently available clustering techniques are unsuitable for use in financial industry AI system because of the difficulties described herein relative to financial utterances. Presently available clustering techniques, when subjected to financial utterances inputs generate either too many clusters or too few clusters, duplicate clusters, or clusters with less than desirable cohesiveness, owing to the fact that financial utterances contain significant overlap in terminology and other factors described herein. The resulting clusters also lack cohesiveness. These factors relevant to financial utterances are also responsible for high dimensionality of vectorized data for clustering, which further exacerbates this over or under clustering problem with the existing methods.

The illustrative embodiments recognize that a clustering technique has to be nontrivially modified and adapted with code specifically configured for handling the overlap in terminology and other factors related to financial utterances in order to generate an optimum number of clusters that exhibit optimum coherency and distinction among the clusters. The illustrative embodiments provide a nuanced categorization process that is usable for improving the performance of utterance clustering in the complexity of real-world financial interactions, ensuring that user intent is understood accurately and that appropriate actions are generated corresponding to the clusters.

A non-limiting scientific or technological experimentation description of the proposed architecture of the various embodiments, its principle of operation, experimentation using the proposed architecture with certain example cases and data, corresponding results from the proposed architecture and comparative analysis with other presently used techniques, and other related description are now presented. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these description artifacts and the same are contemplated within the scope of the illustrative embodiments. The scientific or technical experimentation description is as follows—

Example Use-case:

Product managers who oversee distinct market segments invest a large proportion of their weekly effort in manually sorting and labeling large volumes of user-generated utterances. This labor-intensive process is slow, error-prone, and hampers the organization's agility to respond to shifting consumer preferences.

Presently Available Technological Solution: Clustering for Natural Language Utterance Analysis:

Utterance data can be either structured or unstructured. Natural language data typically falls under the unstructured category, which presents unique challenges for clustering, so the following process is described with respect to natural language utterances. The first stage cleans and normalizes raw utterances. Common steps include lower-casing, removing punctuation, stripping or replacing stop-words, and correcting spelling or grammatical errors. For spoken text, the audio is first transcribed into words, then the same cleaning logic is applied. The goal is to produce a uniform, vocabulary-aware representation that the downstream model can ingest reliably.

Once the text is cleaned, each utterance is fed into a pre-trained language encoder (e.g., a sentence-transformer). The model transforms the token sequence into a dense numeric vector that captures semantic meaning while hiding explicit word identities. The result is a set of high-dimensional vectors called an embedding-one per utterance-that can be operated on numerically.

Embeddings are the output of an algorithmic process that is usually encapsulated in a model and exposed through a tool or library. Embeddings are often hundreds of dimensions long, which can slow clustering and introduce noise.

Dimensionality reduction of an embedding is the process of taking a dense vector (e.g., 128-512 or more dimensions) and producing a shorter vector that keeps the same "meaning" while discarding redundancy. A dimensionality-reduction step-implemented as a statistical or shallow neural method using techniques such as PCA, UMAP, t-SNE, encoder-decoder networks, transformer-based VAEs, feature thresholding-compresses these vectors while preserving the most relevant structure. The compressed vectors (or reduced dimensionality embedding (RDE, data point)) retain the gist of the utterance and provide a more tractable space for grouping.

With a compact vector for every utterance, an unsupervised clustering algorithm is applied. Whether it's K-Means, or agglomerative clustering, the algorithm groups vectors that lie close together in the reduced space, implicitly gathering utterances that share similar topics or intents.

Because clustering is unsupervised, we assess quality using internal metrics such as silhouette width, Calinski-Harabasz score, or Davies-Bouldin index. These scores gauge how distinct and cohesive the formed groups are. Optional extrinsic evaluations—like checking how well clusters improve a downstream classification task or how well they align with human-labelled themes—provide additional validation.

This pipeline— clean>>embed>>compress>>cluster>>evaluate as depicted in FIG. 2, is normally employed to turn raw conversational data into actionable, structured insights. However, when it comes to financial industry AI system and financial utterances, the illustrative embodiments recognized certain key technical challenges with this type of existing technological solutions:

1. Text Input—Raw language must first be mapped to numerical vectors. Mitigation: Vectorization via a state-of-the-art sentence encoder (e.g., all-mpnet-base-V2).

2. High Dimensionality—Embedding spaces can have hundreds of dimensions, which increases computation and risks over-fitting. For e.g. BERT=768-D, GPT=1024-D. Text data inherently has high dimensionality because each word in a corpus or dataset can be considered a separate feature. For e.g. in the utterance "bank near me", bank could mean riverbank or a financial entity. To delineate them, we need to understand the context and retain it when we convert the natural language data into numerical format. Mitigation: Apply dimensionality-reduction such as PCA, UMAP, or t-SNE before clustering.

3. Scalability—Processing millions of utterances can exceed typical compute budgets. Mitigation: Batch-wise computation, optional down-sampling, or approximate nearest-neighbor indexing.

4. Noise Sensitivity—Short or ambiguous utterances produce weak vectors, potentially forming spurious clusters. Mitigation: Pre-processing (stop-word removal, spell correction) and selecting robust embedding models.

5. Evaluation Without Labels—Unsupervised output lacks ground-truth classes, making quantitative assessment difficult. Mitigation: Rely on downstream task performance or crowd-source human labeling to validate cluster quality.

6. Hyper-parameter Choices in K-Means/Agglomerative—Selecting the number of clusters, linkage method, distance metric, and thresholds can dramatically affect results. Mitigation: Systematic grid search, silhouette-based heuristics, and domain-specific expertise.

7. Post-Cluster Human Review—Even with good silhouette scores, clusters may contain overlap, duplicates, or an inappropriate granularity.

Outcome: Manual re-run on filtered subsets becomes necessary to align with business objectives.

Because utterance data is inherently unstructured, we observed that traditional clustering methods often produce overlapping clusters or misclassify utterances into incorrect clusters.

The illustrative embodiments now present a modification to the existing technological solution for the recognized problems in financial industry AI system operating with financial utterances.

To overcome the limitations above, we adopted "a parameter-free method inspired by physical torque, as depicted in FIG. 3. This technique is inspired by the concept that cluster interactions (grouping of data) can be modeled considering mass (number of data points in a cluster) and distance (between clusters). This technique is based on gravitational force, torque and torque balance.

Gravitational force influences the formation of clusters by drawing similar items closer together. Torque pertains to how various forces such as stimuli from data points or features affect the orientation and stability of clusters. It helps in understanding how clusters can shift or rotate in response to changes in data or external influences. Torque balance means that the forces acting on the clusters are in equilibrium, allowing for stable formations or clusters without expansion or contraction thus maintaining the structure of the cluster. While gravitational force tends to pull items together to form clusters, torque and torque balance can influence the orientation and dynamics of those clusters.

This approach allows the clustering method to be parameter-free, robust to noise, and flexible, using the balance (not just attraction) between data groups to identify clusters.

In this framework, each data point is treated as a "mass" that exerts mutual influence on its neighbors. The principle of torque balance is used to identify dense clusters. By summing the torque vectors that pull neighboring points together, the algorithm identifies dense regions without requiring an a-priori specification of cluster count or distance thresholds. This data-driven discovery naturally handles noise and irregular shapes by letting the torque dynamics contract sparse areas and expand dense cores. The self-correcting process refines cluster boundaries, reduces over-merging, and produces clearer, business-relevant themes, thereby cutting the need for repeated manual correction and accelerating the feedback loop for product teams.

Torque-Based Clustering—Method Summary

During experimentation we defined a torque value for every point as mass x distance. To determine a suitable mass, we explored four methods:

1. Uniform—every point receives the same mass.
2. Density-based—mass increases with the local point density, estimated from the k-nearest neighbors.
3. Feature-sum—mass equals the sum of the absolute values of a point's feature vector (i.e., as a function of a sum of a selected few or all the feature values in the compressed feature vector of the point).
4. Feature-variance—mass grows with the variance among a point's features (i.e., as a function of the variance between a selected few or all the features in the compressed feature vector of the point).

Distances were calculated with the standard Euclidean metric, i.e., the square form of pairwise Euclidean distance, so that closer neighbors contribute more.

Figure 6:
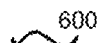
FIG. 6 depicts the comparative results of one experiment.
Figure 7:
FIG. 7 depicts the comparative results of another experiment.
Figure 8:
FIG. 8 depicts the comparative results of another experiment.

In experimentation, as depicted in FIGS. 6-8, feature variance method resulted in better clusters among other mass calculation techniques because it's a measure that quantifies the amount of variation or dispersion within a set of data points which helps to form natural clusters.

With mass and distance in hand, we summed the torque that every point's neighbors exerted on it. Points with larger mass and stronger pull thus shifted more in the direction of the net torque, while distant points had a weaker effect. The system iteratively updated all points using a small learning rate; the iterations stopped when the average displacement fell below a tolerance or when a preset maximum was reached.

Once torque-adjusted positions were stable, we re-applied a conventional clustering routine (e.g., k-means). The elbow criterion and silhouette scores guided the choice of the final number of clusters. Compared with the previous "straight-forward" pipeline, the torque-preprocessing produced clusters that were both more tightly packed internally and more clearly separated from one another, leading to a noticeable improvement in downstream grouping quality.

Conclusion: Our experiments on high-dimensional natural language utterances demonstrate that applying K-Means to torque-adjusted embeddings delivers consistently higher cluster quality than traditional K-Means or agglomerative methods. By letting data points "pull" one another based on locally estimated mass and mutual distances, the torque pre-processing discovers natural groupings without the need for manual tuning of cluster counts or distance metrics. To our knowledge, this is the first use of a torque-based framework for clustering textual embeddings, and it provides a robust, hyper-parameter-free pathway for uncovering hidden, semantically meaningful patterns in unstructured natural language text data.

End of Scientific or Technical Experimentation Description.

Currently, there exists a problem with using existing clustering techniques with financial utterances due to the nuanced nature of financial utterances which cause either too many clusters which overlap each other by more than a desirable degree or too few clusters that leave gaps of uncovered subject-matter between the identified clusters. Overlapping clusters create ambiguity in generating actionable outputs from the clustering and too many clusters require further processes—either human oversight or additional code to identify significant clusters. Both of these problems lead to difficulty in automatic triggering of actions in machines and data processing systems in response to financial utterances. A different problem occurs when too few clusters leave gaps of unaddressed subject-matter from the financial utterances—a system may fail to respond to a requested or required actions according to the utterances.

The present disclosure addresses these deficiencies by providing a computer implemented method, a computer usable program product, and a data processing system for mass-based clustering of utterances in financial contexts, improve the present state of the art technology by processing the financial utterances in a financial application-specific manner to generate an optimal number of clusters with optimal coherency and overlap. Optimality of cluster numbers is tunable for specific financial applications, and is generally intended to mean a number that does not exceed a set optimum threshold number. Similarly, optimal coherence means the coherence of any generated cluster not being below a set coherence threshold value; and optimal overlap means the overlap between any two generated clusters not exceeding a set overlap threshold value The improvements made by the illustrative embodiments to the existing clustering technology result in enabling automatic action identification in a manner that is suitable for triggering automatic operations in one or more other data processing systems in the financial data processing environment, as shown by a non-limiting example in FIG. 4.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 900 of FIG. 9. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 912 of FIG. 9.

The one or more user device interfaces 104 are one or more components of user device 100 that facilitate receiving input from and providing output to something external to user device 100. The one or more user device interfaces 104 can include one or more aspects described below in relation to the one or more interfaces 918 of FIG. 9.

User device memory 106 is a collection of one or more components of user device 100 configured to store instructions and data for later retrieval and use. User device memory 106 can include one or more aspects described below in relation to memory 914 of FIG. 9. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 912 of FIG. 9.

Other device memory 124 is a collection of one or more components of other device 120 configured to store instructions and data for later retrieval and use. Other device memory 120 can include one or more aspects described below in relation to memory 914 of FIG. 9. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 918 of FIG. 9.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 912 of FIG. 9.

The one or more server interfaces 154 are one or more components of server 150 that facilitate receiving input from and providing output to something external to server 150. The one or more server interfaces 154 can include one or more aspects described below in relation to the one or more interfaces 918 of FIG. 9.

Server memory 150 is a collection of one or more components of server 150 configured to store instructions and data for later retrieval and use. Server memory 150 can include one or more aspects described below in relation to memory 914 of FIG. 9. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

FIG. 2 depicts an existing clustering process that can be improved in accordance with an illustrative embodiment. In an existing implementation of process 200, utterance/data pull operation 202 initiates the process by gathering relevant utterance data. Text Preprocessing 204 processes the gathered utterance data to prepare it for embedding.

Embeddings generation operation 206 generates embeddings from the pre-processed text (e.g., using Sentence Transformers). Clustering operation 208 clusters the embeddings using specified clustering algorithms, e.g., using K-Means or Agglomerative models. Evaluation operation 210 evaluates the clusters based on silhouette coefficient and threshold criteria, e.g., using a silhouette coefficient and/or a threshold. Cluster Labeling operation 212 labels the evaluated clusters. Cluster visualization operation 214 visualizes the labeled clusters, e.g., using T-SNE plots. Cluster/Label review operation 216 reviews the visualized clusters and labels, e.g., through human evaluation. The process ends thereafter. This process would suffer from the deficiencies identified herein, including producing too many or too few clusters with less than optimal coherency and overlap for actioning in a financial application environment.

FIG. 3 depicts an improved clustering process using torque principles in accordance with an illustrative embodiment. Process 300 can be implemented in server 150 as server instructions 158 in FIG. 1. Utterance/Data pull operation 302 initiates the process by gathering relevant financial utterances data. Financial utterances may be obtained as textual data, natural language (NL) speech, video or graphical input of a gesture indicative of an intended action, or some combination of these and other forms of utterances or inputs during an interaction with a financial application. a gesture may include verbal clues or may be a nonverbal gesture without any associated verbal clues. A text preprocessing operation, such as a modified form of operation 204 in FIG. 2, processes the gathered financial utterances data to prepare it for embedding. For example, the preprocessing operation may preprocess speech into text by applying a speech-to-text transformation to speech data, or by applying a gesture recognition model to decode a video or graphical gesture into a textual description of an intended utterance relative to a financial application or device. These examples of pre-processing are not intended to be limiting.

From this disclosure, those of ordinary skill in the art will be able to conceive many other preprocessing and the same are contemplated within the scope of the illustrative embodiments.

Embeddings generation operation 304 generates embeddings from the gathered Natural language utterances, the preprocessed textual data, or some combination thereof. Dimensionality reduction operation 306 reduces the dimensionality of the embeddings in a manner described earlier. Mass assignment operation 308 assigns mass to data points (i.e., to the reduced dimension embedding) using the Torque Principle described earlier. In other words, operation 308 assigns a value representing a mass or mass-like property to the reduced data points such that the data point behaves like, or emulates, a physical object having a mass in a simulated physical dimensioned space in which the mass-bearing data points (MD(s)) behave and move relative to one another according to the physics of forces acting on physical objects consistent with principles governing torque. Clustering operation 310 applies a suitable clustering technique, such as K-Means clustering, while adjusting the positions of the data points. The position of a data point "A" relative to other data points "B", "C", . . . "N" is adjusted by computing the forces exerted on one mass-bearing data point A by other mass-bearing data points B, D, . . . F, situated in a neighborhood of the data point A at distances computed according to difference between each data point vector pair AB, AD, . . . AF. The neighborhood can be defined either by the closes "n" data points to data point A regardless of their distance from A, or all data points within a threshold distance "d" from A regardless of the number of data points falling within distance d from A. a neighborhood can also be defined by selecting only a subset of data points within distance d from A using a suitable selection criterion.

The resulting position-adjusted data points are referred to as torque-adjusted data points. Scoring operation 312 calculates one or more score for a generated cluster, such as by using the Adjusted Rand Index (ARI) and/or silhouette scores for the clusters. A score of a cluster is indicative of the cluster's cohesiveness, overlap with another cluster, or some combination thereof. The mass assignment, torque-based clustering and scoring repeats iteratively until an exit condition is reached. One exit condition may be that the cluster scores for a determined number of clusters indicates optimum coherence, optimum overlap, or both. Another exit condition may be that a determined number of iterations have been executed. Another exit condition may be that an improvement in a score from one iteration to the next is below an improvement threshold indicating that further iterations are not going to be productive in improving the scores. An exit condition can be a combination of one or more conditions described herein or other similarly purposed conditions.

Label generation operation 314 generates one or more labels corresponding to the generated and scored clusters, such as by using one or more large language models (LLMs) trained to convert a cluster of data points into an actionable label. The process ends thereafter. Some non-limiting examples of actionable labels include code that is configured to trigger a specific action at another data processing system in a financial data processing environment, code that is configured to cause a specific financial application to perform a specific function in a financial data processing environment, code that is configured to generate another code to implement a requested feature corresponding to the action at a data processing system in a financial data processing environment, code that is configured to trigger a notification in a financial data processing environment, or some combination of these and other manifestations of actionable labels that are readily conceivable from this disclosure by those of ordinary skill in the art.

Figure 4:
FIG. 4 depicts a financial utterance clustering application in accordance with an illustrative embodiment.

FIG. 4 depicts a financial utterance clustering application in accordance with an illustrative embodiment. Financial utterance clustering application 402 can be implemented as server code 158 in FIG. 1, to perform all or a part of process 300 of FIG. 3.

Application 402 receives utterance data component 404 as input. Input 404 includes financial utterances as described herein. Preprocessing component 406 preprocesses the utterance data of input 404. Embedding generation component 408 generates embeddings from the preprocessed data. Dimensionality reduction component 410 reduces the dimensionality of the generated embeddings. Mass assignment 412 assigns, reassigns, and/or adjusts a mass of the reduced data point embeddings vectors according to one or more different mass computation methods as described with respect to FIG. 5.

Torque adjusted clustering component 414, operating iteratively in conjunction with mass assignment component 412 towards an exit condition in a manner described herein, clusters the mass-assigned data points using torque principles. Cluster scoring component 416 scores the generated clusters. Label generation component 418 generates actionable labels (also interchangeably referred to herein as labeled actions) corresponding to the scored clusters.

Application 402 outputs one or more actionable labels 420, which cause or trigger further actions, such as automated machine operations and/or functions, in a data processing system in the data processing environment providing financial services. Some non-limiting examples of the systems where the contemplated further actions may trigger automated operations or functions include, feature development system 422 that develops code of a feature based on an instruction according to an actionable label; user management and support system 424 that performs management and support functions for a user according to an actionable label; workflow management and change system 426 that creates a workflow or causes a change in a managed workflow based on an actionable label; human supervision system 428 that receives a notification for human attention to an actionable label; or some combination of these and other systems or components of a financial services data processing environment.

FIG. 5 depicts various modes of mass assignment and torque adjusted clustering in accordance with an illustrative embodiment. Mass assignment component 502 is an example implementation of mass assignment component 412 in FIG. 4. Torque adjusted clustering component 512 is an example implementation of torque adjusted clustering component 414 in FIG. 4.

Mass assignment component 502 includes several subcomponents, each subcomponent computing and adjusting the mass values using a different strategy. The same or different strategies for mass determination can be used during an iterative torque-based clustering described herein. Subcomponent 504 assigns uniform mass to all data points in a given set. Subcomponent 506 assigns mass based on a local density of a neighborhood of a data point. As computed by subcomponent 506, mass is proportional to local density (, e.g., as determined using k-nearest neighbors (KNN) algorithm). To assign mass using local density, subcomponent 506 implemented the following steps:

Calculate square form of pairwise distances for each data
    point

Sort the distances in an ascending order

Find KNN distances for each data point where k=a predetermined value, e.g., 5 local_density (for each data point)=1/(mean KNN distances+negligible value)

Finally normalize local density by dividing sum of local densities

Subcomponent 508 assigns mass based on the sum of features of data points. Mass of a data point is proportional to the sum of that data point's absolute feature values. In one embodiment, all feature values are selected in the summation. In another embodiment, a subset of features is selected according to a suitable selection criterion and only the selected subset of features are included in the summation. The summation is performed as follows—

$$\text{feature\_sum=sum(abs(feature\_values over a given axis)}$$

Subcomponent 510 assigns mass based on the variance of features of data points. Mass of a data point is proportional to the variance of the data point's features. In one embodiment, all feature values are selected in the variance determination. In another embodiment, a subset of features is selected according to a suitable selection criterion and only the selected subset of features are included in the variance determination. The variance determination is performed as follows—

$$\text{feature\_variance=var(feature\_values over a given axis)/sum(var(feature\_values over a given axis)}$$

Torque adjusted clustering component 512 includes several sub-components. Torque Calculation 514 calculates torque for data points. Data Point Shifting 516 shifts data points based on calculated torque. Cluster Generation 518 generates clusters from the shifted data points. The process ends thereafter.

FIG. 6 depicts the comparative results of one experiment. Table 600 shows a distinct improvement in clustering with the inventive torque adjusted method over an existing K-Means method of clustering on vectors of 768 features. The ARI index, Silhouette score, and the number of clusters all show improvement with torque based clustering, especially using density method, feature sum method, and feature variance method of mass assignments.

FIG. 7 depicts the comparative results of another experiment. Table 700 shows a distinct improvement in clustering with the inventive torque adjusted method over an existing K-Means method of clustering on UMAP reduced feature vectors. The ARI index, Silhouette score, and the number of clusters all show improvement with torque based clustering, especially using density method, feature sum method, and feature variance method of mass assignments.

FIG. 8 depicts the comparative results of another experiment. Table 800 shows a distinct improvement in clustering with the inventive torque adjusted method over an existing K-Means method of clustering on vectors of 768 features with torque adjusted using a k=5 neighbors. The ARI index, Silhouette score, and the number of clusters all show improvement with torque based clustering, especially using density method, feature sum method, and feature variance method of mass assignments.

FIG. 9 depicts a data processing environment 20 in which aspects of the present disclosure may be implemented. Computing environment 900 is a set of one or more virtual or physical computers 910 that individually or in cooperation achieve tasks, such as implementing one or more aspects described herein. Computers 910 have components that cooperate to cause output based on input. Example computers 910 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 900 includes at least one physical computer.

Computing environment 900 may specifically be used to implement one or more aspects described herein. In some examples, one or more of computers 910 may be implemented as a user device, such as mobile device and others of computers 910 may be used to implement aspects of a machine learning framework useable to train and deploy models exposed to the mobile device or provide other functionality, such as through exposed application programming interfaces.

Computing environment 900 can be arranged in any of a variety of ways. Computers 910 can be local to or remote from other computers 910 of environment 900. Computing environment 900 can include computers 910 arranged according to client-server models, peer-to-peer models, edge computing models, other models, or combinations thereof.

In many examples, computers 910 are communicatively coupled with devices internal or external to computing environment 900 via network 902. Network 902 is a set of devices that facilitate communication from a sender to a destination, such as by implementing communication protocols. Example networks 902 include local area networks, wide area networks, intranets, or the Internet.

In some implementations, computers 910 can be general-purpose computing devices (e.g., consumer computing devices). In some instances, via hardware or software configuration, computers 910 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 910 include one or more processors 912, memory 914, and one or more interfaces 918. Such components can be virtual, physical, or combinations thereof.

The one or more processors 912 are components that execute instructions, such as instructions that obtain data, process the data, and provide output based on the processing. The one or more processors 912 often obtain instructions and data stored in memory 914. The one or more processors 912 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 912 include at least one physical processor implemented as an electrical circuit. Example providers of processors 912 include INTEL, AMD, QUALCOMM, TEXAS INSTRUMENTS, and APPLE.

Memory 914 is a collection of components configured to store instructions 916 and data for later retrieval and use. Instructions 916 can, when executed by the one or more processors 912, cause execution of one or more operations that implement aspects described herein. In many examples, memory 914 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 914 can store information encoded in transient signals.

The one or more interfaces 918 are components that facilitate receiving input from and providing output to something external to computer 910, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 918 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-Fl, cellular, BLUETOOTH, ZIGBEE, or other protocols). One or more of the one or more interfaces 918 can facilitate connection of computing environment 900 to network 990.

Computers 910 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, textto-speech, image analysis, research features, and other features, which may also be used as applicable.

Figure 10:
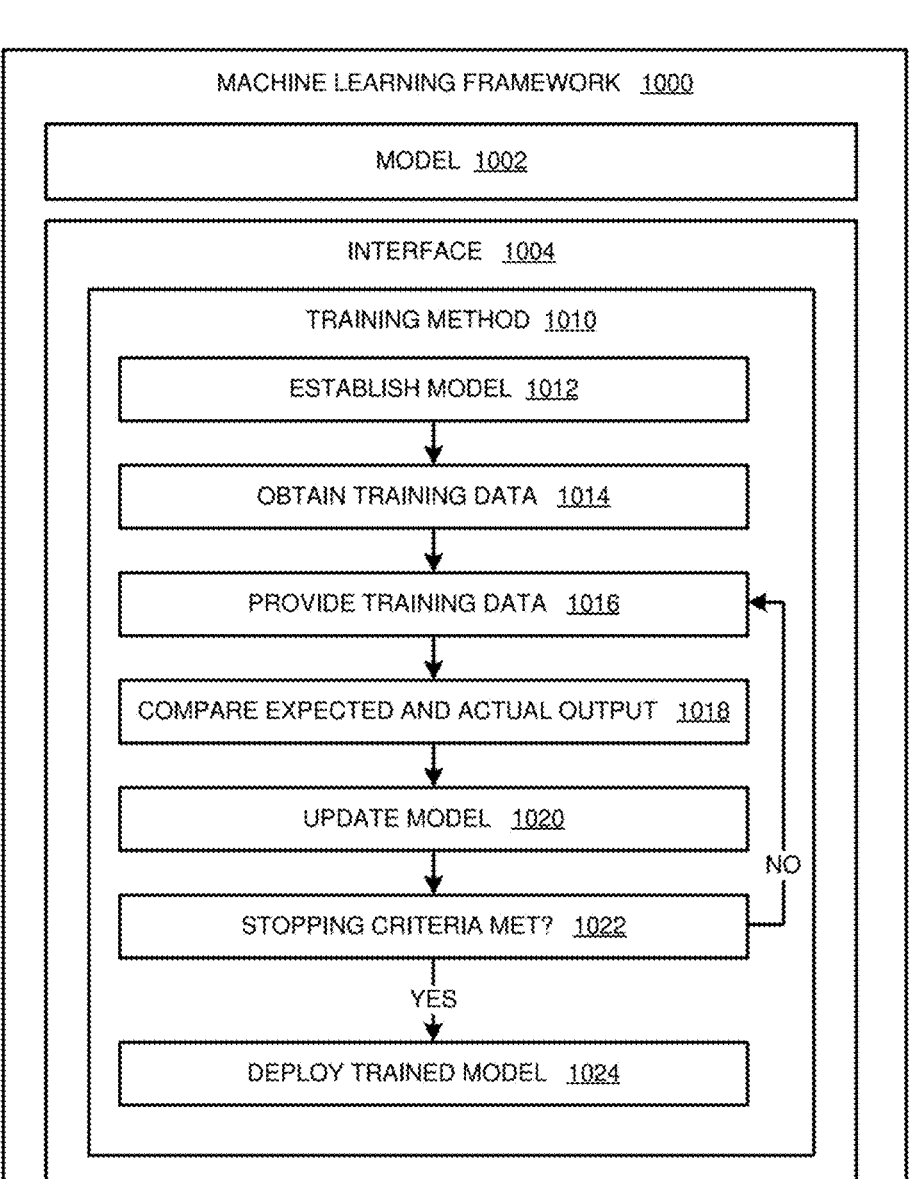
FIG. 10 depicts a configuration for machine learning in which aspects of the present disclosure may be implemented.

FIG. 10 illustrates an example machine learning framework 1000 that techniques described herein may benefit from or improve on. A machine learning framework 1000 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1000 or components thereof are often built or refined from existing frameworks, such as TENSORFLOW by GOOGLE, INC. or PYTORCH by the PYTORCH community.

The machine learning framework 1000 can include one or more models 1002 that are the structured representation of learning and an interface 1004 that supports use of the model 1002.

The model 1002 can take any of a variety of forms. In many examples, the model 1002 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1002 can include a representation of memory (e.g., providing long short-term memory functionality). Where the set includes more than one model 1002, the models 1002 can be linked, cooperate, or compete to provide output.

The interface 1004 can include software procedures (e.g., defined in a library) that facilitate the use of the model 1002, such as by providing a way to establish and interact with the model 1002. For instance, the software procedures can include software for receiving input, preparing input for use (e.g., by performing vector embedding, such as using Word2Vec, BERT, or another technique), processing the input with the model 1002, providing output, training the model 1002, performing inference with the model 1002, fine tuning the model 1002, other procedures, or combinations thereof.

In an example implementation, interface 1004 can be used to facilitate a training method 1010 that can include operation 1012. Operation 1012 includes establishing a model 1002, such as initializing a model 1002. The establishing can include setting up the model 1002 for further use (e.g., by training or fine tuning). The model 1002 can be initialized with values. In examples, the model 1002 can be pretrained. Operation 1014 can follow operation 1012. Operation 1014 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1002. Operation 1016 can follow operation 1014. Operation 1016 includes providing a portion of the training data to the model 1002. This can include providing the training data in a format usable by the model 1002. The framework 1000 (e.g., via the interface 1004) can cause the model 1002 to produce an output based on the input. Operation 1018 can follow operation 1016. Operation 1018 includes comparing the expected output with the actual output. In an example, this can include applying a loss function to determine the difference between expected and actual. This value can be used to determine how training is progressing. Operation 1020 can follow operation 1018. Operation 1020 includes updating the model 1002 based on the result of the comparison. This can take any of a variety of forms depending on the nature of the model 1002. Where the model 1002 includes weights, the weights can be modified to increase the likelihood that the model 1002 will produce correct output given an input. Depending on the model 1002, backpropagation or other techniques can be used to update the model 1002. Operation 1022 can follow operation 1020. Operation 1022 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1014. If the stopping criterion has been satisfied, the flow can move to operation 1022. Operation 1022 includes deploying the trained model 1002 for use in production, such as providing the trained model 1002 with real-world input data and produce output data used in a real-world process. The model 1002 can be stored in memory 914 of at least one computer 910, or distributed across memories of two or more such computers 910 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments have been presented for purposes of illustration but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
   generating, by reducing a dimensionality of a multidimensional vector of an embedding corresponding to an utterance, a compressed vector;
   forming, by assigning a mass value to the compressed vector to form a mass-bearing data point (MD) in a set of MDs;
   iteratively adjusting a torque value using mass values and pairwise distances between pairs of members of a first subset of MDs from MDs from the set of MDs, the first subset of MDs forming a neighborhood of the MD;
   increasing, responsive to the iterative adjusting, a coherency in the first subset of MDs with a singular actionable label; and
   triggering from the singular actionable label, an operation in a data processing environment.

2. The computer-implemented method of claim 1, further comprising:
   receiving the utterance from a device configured to perform a function relative to the data processing environment.

3. The computer-implemented method of claim 1, wherein the utterance comprises natural language (NL) speech, and wherein the NL speech comprises a phrase spoken with an associated intent of causing the operation of a function relative to the data processing environment.

4. The computer-implemented method of claim 3, wherein the phrase comprises a contraction of an expression, wherein the expression maps to a plurality of functions.

5. The computer-implemented method of claim 4, wherein different placements of a word in the NL speech are indicative of different functions in the plurality of functions.

6. The computer-implemented method of claim 1, wherein the utterance comprises video data of a nonverbal gesture, and wherein the nonverbal gesture has an associated intent of causing the operation of a function relative to the data processing environment.

7. The computer-implemented method of claim 6, wherein the nonverbal gesture corresponds to an expression, wherein the expression maps to a plurality of functions.

8. The computer-implemented method of claim 7, wherein different patterns in the nonverbal gesture are indicative of different functions in the plurality of functions.

9. The computer-implemented method of claim 1, further comprising:
  preprocessing the utterance, wherein the preprocessing comprises speech-to-text conversion of an NL speech in the utterance.

10. The computer-implemented method of claim 1, further comprising:
  preprocessing the utterance, wherein the preprocessing comprises video-to-text conversion of a gesture in the utterance.

11. The computer-implemented method of claim 1, wherein the utterance is a member of a set of utterances, wherein the set of utterances comprises a subset of past utterances and a subset of present utterances, and wherein both the subsets are from a first user.

12. The computer-implemented method of claim 11, wherein the set of utterances comprises:
  a subset of present utterances of the first user;
  a subset of present utterances of a second user;
    a subset of past utterances of the first user; and
  a subset of present past utterances of the second user.

13. The computer-implemented method of claim 1, wherein the utterance is a member of a set of utterances comprising a subset of past transactions and a subset of present utterances, wherein both the subsets are from a common user.

14. The computer-implemented method of claim 1, wherein the reducing comprises executing a feature thresholding operation on the embedding.

15. The computer-implemented method of claim 1, further comprising:
  computing, as a part of assigning the mass value to the compressed vector, the mass value as a proportion of a sum of absolute values of a set of features in the compressed vector.

16. The computer-implemented method of claim 1, further comprising:

computing, as a part of assigning the mass value to the compressed vector, the mass value as a function of: (1) a variance in a set of features in the compressed vector, (2) a local density of the neighborhood of the MD, or a combination of (1) and (2).

17. The computer-implemented method of claim 1, further comprising:
  changing, as a part of the iteratively adjusting, a value in the compressed vector of the MD such that a vector distance between the MD and the MD1 is reduced.

18. A computer program product comprising one or more computer readable storage media, and program instructions collectively stored on the one or more computer readable storage media, the program instructions executable by a set of one or more processors to cause the set of one or more processors to perform operations comprising:
  generating, by reducing a dimensionality of a multidimensional vector of an embedding corresponding to an utterance, a compressed vector;
  forming, by assigning a mass value to the compressed vector to form a mass-bearing data point (MD) in a set of MDs;
  iteratively adjusting a torque value using mass values and pairwise distances between pairs of members of a first subset of MDs from the set of MDs, the first subset of MDs forming a neighborhood of the MD;
  increasing, responsive to the iterative adjusting, a coherency in the first subset of MDs with a singular actionable label; and
  triggering from the singular actionable label, an operation in a data processing environment.

19. The computer program product of claim 18, wherein the stored program instructions are stored in a computer readable storage device in a data processing system, and wherein the stored program instructions are transferred over a network from a remote data processing system.

20. A computer system comprising a set of one or more processors and one or more computer readable storage media, and program instructions collectively stored on the one or more computer readable storage media, the program instructions executable by the set of one or more processors to cause the processor to perform operations comprising:
  generating, by reducing a dimensionality of a multidimensional vector of an embedding corresponding to an utterance, a compressed vector;
  forming, by assigning a mass value to the compressed vector to form a mass-bearing data point (MD) in a set of MDs;
  iteratively adjusting a torque value using mass values and pairwise distances between pairs of members of a first subset of MDs from the set of MDs, the first subset of MDs forming a neighborhood of the MD;
  increasing, responsive to the iterative adjusting, a coherency in the first subset of MDs with a singular actionable label; and
  triggering from the singular actionable label, an operation in a data processing environment.

* * * * *